United States Patent
Cicchini

(10) Patent No.: US 10,590,848 B2
(45) Date of Patent: Mar. 17, 2020

(54) FLIGHT VEHICLE AIR BREATHING PROPULSION SYSTEM WITH ISOLATOR HAVING OBSTRUCTION

(71) Applicant: Raytheon Company, Waltham, MA (US)

(72) Inventor: Nicholas P. Cicchini, Vail, AZ (US)

(73) Assignee: Raytheon Company, Waltham, MA (US)

(*) Notice: Subject to any disclaimer, the term of this patent is extended or adjusted under 35 U.S.C. 154(b) by 293 days.

(21) Appl. No.: 15/615,152

(22) Filed: Jun. 6, 2017

(65) Prior Publication Data

US 2018/0347462 A1 Dec. 6, 2018

(51) Int. Cl.
*F02K 7/10* (2006.01)
*F02C 7/04* (2006.01)
(Continued)

(52) U.S. Cl.
CPC ............... *F02C 7/04* (2013.01); *B64C 23/04* (2013.01); *B64C 30/00* (2013.01); *B64D 27/16* (2013.01);
(Continued)

(58) Field of Classification Search
CPC ........... F02C 7/04; B64C 23/04; B64C 30/00; B64D 33/02; B64D 2033/0226;
(Continued)

(56) References Cited

U.S. PATENT DOCUMENTS 2,989,846 A * 6/1961 Hausammann ......... F02C 7/057
137/15.2
3,777,488 A 12/1973 Gross et al.
(Continued)

FOREIGN PATENT DOCUMENTS

EP    1 445 465 A1    8/2004
EP    1 898 080 A2    3/2008
(Continued)

OTHER PUBLICATIONS

Sabean et al., "Computational Optimization of a Hypersonic Rectangular-to-Circular Inlet", Journal of Propulsion and Power, vol. 17, No. 3, May-Jun. 2001, pp. 571-578.
(Continued)

*Primary Examiner* — Steven M Sutherland
(74) *Attorney, Agent, or Firm* — Renner, Otto, Boisselle & Sklar, LLP

(57) ABSTRACT

A flight vehicle has a propulsion system that includes an air inlet, an isolator (or diffuser) downstream of the air inlet, and a combustor downstream of the isolator. The isolator includes an obstruction that protrudes inwardly from an inner wall of the isolator, into the flow channel in which air flows through the isolator. The obstruction diverts the flow to either side of it. Downstream of the obstruction the flow on either side of the obstruction comes together again, leading to mixing of the flow, for example including mixing of low energy and boundary layer flow with high energy flow. This mixing of flow may make for a more uniform flow at the exit of the isolator. In addition the obstruction may help fix the location of shocks within the isolator, providing longer flow mixing length in the isolator.

25 Claims, 6 Drawing Sheets

(51) Int. Cl.
| | | |
|---|---|---|
| *B64D 27/16* | (2006.01) | |
| *B64C 30/00* | (2006.01) | |
| *B64C 23/04* | (2006.01) | |
| *F02C 3/04* | (2006.01) | |
| *B64D 33/02* | (2006.01) | |

(52) U.S. Cl.
CPC ............... *B64D 33/02* (2013.01); *F02C 3/04* (2013.01); *F02K 7/10* (2013.01); *B64D 2033/026* (2013.01); *B64D 2033/0226* (2013.01); *F05D 2220/10* (2013.01); *F05D 2220/80* (2013.01); *F05D 2240/35* (2013.01); *F05D 2250/72* (2013.01); *F05D 2250/73* (2013.01)

(58) Field of Classification Search
CPC . B64D 2033/026; F02K 7/10; F02K 7/12–20; F02K 7/14; F05D 2220/10; F05D 2220/80
See application file for complete search history.

(56) References Cited

U.S. PATENT DOCUMENTS

| | | | |
|---|---|---|---|
| 5,058,837 | A | 10/1991 | Wheeler |
| 5,082,206 | A | 1/1992 | Kutschenreuter, Jr. et al. |
| 5,881,758 | A | 3/1999 | Koncsek et al. |
| 6,793,175 | B1 * | 9/2004 | Sanders ................. B64C 30/00 137/15.1 |
| 7,048,229 | B2 | 5/2006 | Sanders et al. |
| 8,434,723 | B2 | 5/2013 | Simpson et al. |
| 8,656,957 | B2 | 2/2014 | Babinsky et al. |
| 9,447,731 | B1 | 9/2016 | Adamson et al. |
| 2006/0107648 | A1 | 5/2006 | Bulman et al. |
| 2007/0235590 | A1 | 10/2007 | Kokoshkin et al. |
| 2008/0060361 | A1 | 3/2008 | Morrison et al. |
| 2008/0092519 | A1 | 4/2008 | Bulman |
| 2008/0128547 | A1 * | 6/2008 | Pederson ................. B64C 30/00 244/55 |
| 2008/0283677 | A1 | 11/2008 | Pederson et al. |
| 2012/0049008 | A1 | 3/2012 | Domel et al. |
| 2014/0182697 | A1 | 7/2014 | Davidenko et al. |
| 2014/0224949 | A1 | 8/2014 | Rybalko et al. |

FOREIGN PATENT DOCUMENTS

| | | |
|---|---|---|
| GB | 911 074 | 11/1962 |
| RU | 2 343 297 | 1/2009 |
| WO | 2017/158857 A1 | 9/2017 |

OTHER PUBLICATIONS

Sabean et al., "Optimization of a Hypersonic Inlet with a Rectangular to Circular Transition", American Institute of Aeronautics & Astronautics, AIAA 99-0612, 1999, pp. 1-9.

Pending claims of co-pending U.S. Appl. No. 15/468,441, filed Mar. 24, 2017.

Pending claims of co-pending U.S. Appl. No. 15/615,146, filed Jun. 6, 2017.

International Search Report and Written Opinion for corresponding International Search Report PCT/US2018/018745 dated May 11, 2018.

Guonko et al., "Numerical investigation of flow over two sweepback wedges at M=4 and 6", Thermophysics and Aeromechanics, vol. 20, No. 2, 2013, pp. 179-193.

Settles et al., "Investigation of Three-Dimensional Shock/Boundary-Layer Interactions at Swept Compression Corners", AIAA Journal, vol. 18, No. 7, Jul. 1980, pp. 779-785.

Settles et al., "Cylindrical and Conical Flow Regimes of Three-Dimensional Shock/Boundary-Layer Interactions", AIAA Journal, vol. 22, Feb. 1984, pp. 194-200.

Inger, "Supersonic Viscous-Inviscid Interaction of a Swept Ramp with a Turbulent Boundary Layer", AIAA-85-1669, Jul. 1985, 60 pages.

Stalker, "Spanwise Propagation of Disturbances in Swept Shock Wave-Boundary Layer Interactions", AIAA-82-0988, Jun. 1982, 9 pages.

Zheltovodov et al., "Shock Wave-Boundary-Layer Interactions", Chapter 5.3.4 "Swept Compression Ramp; Interaction and Its Modeling", 2011, pp. 230-237.

Maheswaran et al., "Computational Analysis The Effect of Micro Vortex Generator in E2R Scramjet Engine", May 2013, International Journal of Engineering Research & Technology.

* cited by examiner

FLIGHT VEHICLE AIR BREATHING PROPULSION SYSTEM WITH ISOLATOR HAVING OBSTRUCTION

FIELD OF THE INVENTION

The invention is in the field of propulsion systems for flight vehicles such as airplanes, missiles, pulse detonation engines, projectiles or access-to-space systems.

DESCRIPTION OF THE RELATED ART

Supersonic and hypersonic airbreathing engines, such as dual-mode ramjets/scramjets, include isolators. The isolator is typically a constant-area or slightly-monotonically-increasing area section located downstream of an air inlet throat, between the inlet and an engine/combustor. The purposes for the isolator may be to separate fluctuations between conditions in the inlet and the combustor, to provide a desired flow profile to the combustor, to reduce problems with inlet unstart and/or combustion stability. The isolator may also provide additional pressure rise upstream of the combustor, in the isolator, when the combustor demands it. The isolator must efficiently execute the above at all required flight conditions and throttle settings the air vehicle will operate at.

Isolators can have shock systems setup along their lengths. The resulting shock train can create pressure rises that match those demanded by the combustor. This pressure rise must not allow pressure communications to travel through the isolator boundary layer and upstream past the inlet throat or allow the shock train to extend upstream of the inlet throat, both potentially resulting in unstart of the inlet. The isolator removes dynamic cross-talk between fluctuations in the inlet or combustor that can result in inlet unstart or engine flame-out/stall. Strong shock-boundary layer interactions can occur within the isolator, especially on the body-side of a vehicle where the boundary layer is thickest and has a more depleted energy profile. These strong shock interactions with weak boundary layers can result in high distortion of the flow profile (mass flux, Mach Number, total pressure, etc.) at the isolator exit, which will be ingested by the engine and may reduce combustion efficiency or cause engine stall/flame-out.

SUMMARY OF THE INVENTION

A flight vehicle engine isolator or diffuser has an obstruction therein.

A flight vehicle engine isolator or diffuser has an obstruction that produces a concavity in a flow channel.

A flight vehicle engine isolator or diffuser has an obstruction that increases mixing of the flow along the obstruction length all the way to the isolator exit.

A flight vehicle engine isolator or diffuser has an obstruction that increases vortex strength that may help further mix the low energy flow as well as provide stronger fuel/air mixing downstream in the combustor.

A flight vehicle engine isolator or diffuser has an obstruction that reduces flow separations and/or recirculations and low momentum flow regions.

A flight vehicle engine isolator or diffuser has an obstruction that improves isolator exit flow profile consistency and, if desired, uniformity across multiple flight conditions (Mach number, altitude, angle of attack, sideslip angle) and/or throttle (back pressure) settings.

A flight vehicle engine isolator or diffuser has an obstruction that increases maximum back pressure capability of the isolator by providing high shear stress regions for shock anchoring, by decreasing losses due to separations, and by removing the worst potential flow separation on the body-side centerline which occurs from engine demanded pressure rises that creates strong shock wave boundary layer interactions/separations.

A flight vehicle engine isolator or diffuser has an obstruction that helps anchor one or more shocks in the isolator.

According to an aspect of the invention, a flight vehicle includes: a fuselage; and a propulsion system mechanically coupled to the fuselage. The propulsion system includes: an air inlet; an isolator downstream of the air inlet; and a combustor/engine downstream of the isolator. The propulsion system may also include an exit nozzle. Air passing through the air inlet and the isolator to the combustor passes through a minimum cross-sectional area at a throat that is at a boundary between the air inlet and the isolator. The isolator includes an obstruction that protrudes into the flowpath of air through the isolator, with the obstruction causing diversion of flow in a radial direction, around the obstruction.

According to an embodiment of any paragraph(s) of this summary, the obstruction has a length in a longitudinal direction along which air flows through the isolator that is greater than a width of the obstruction in the radial direction.

According to an embodiment of any paragraph(s) of this summary, the obstruction has a height that extends beyond the boundary layer thickness of the air flow through the isolator.

According to an embodiment of any paragraph(s) of this summary, the obstruction height is at least several times the height of the boundary layer thickness.

According to an embodiment of any paragraph(s) of this summary, the obstruction has a maximum height that is at least 10% of the height of the isolator at a longitudinal location of the maximum height.

According to an embodiment of any paragraph(s) of this summary, the obstruction has a maximum height that is at least 20% of the height of the isolator at a longitudinal location of the maximum height.

According to an embodiment of any paragraph(s) of this summary, the obstruction has a maximum height that is 20%-75% of the height of the isolator at a longitudinal location of the maximum height.

According to an embodiment of any paragraph(s) of this summary, the obstruction has a maximum height that is 30%-50% of the height of the isolator at a longitudinal location of the maximum height.

According to an embodiment of any paragraph(s) of this summary, the obstruction has a maximum height that is 20%-50% of the height of the isolator at a longitudinal location of the maximum height.

According to an embodiment of any paragraph(s) of this summary, the obstruction has a maximum height that is 30%-75% of the height of the isolator at a longitudinal location of the maximum height.

According to an embodiment of any paragraph(s) of this summary, the obstruction has a maximum height that is at least 20% of a maximum extent (or maximum width) of the isolator at a longitudinal location of the maximum height.

According to an embodiment of any paragraph(s) of this summary, the obstruction has a maximum height that is 20%-85%, 40%-70%, 40%-60%, 20%-90%, 20%-70%, 20%-60%, or 40%-90% of a maximum extent (or maximum width) of the isolator at a longitudinal location of the maximum height.

According to an embodiment of any paragraph(s) of this summary, the obstruction is closer to an upstream end of the isolator than to a downstream end of the isolator, thereby being closer to the air intake than to the combustor.

According to an embodiment of any paragraph(s) of this summary, the isolator has an inner wall, or flow boundary/aerodynamic surface, that defines a convex flow channel through the isolator, with the obstruction introducing a concavity into the flow channel.

According to an embodiment of any paragraph(s) of this summary, the combustor is a ramjet or a scramjet.

According to an embodiment of any paragraph(s) of this summary, the combustor includes a turbine.

According to an embodiment of any paragraph(s) of this summary, the engine is a supersonic engine or a hypersonic engine.

According to an embodiment of any paragraph(s) of this summary, the engine is a subsonic engine.

According to an embodiment of any paragraph(s) of this summary, the obstruction includes: an upstream portion with gradually increasing width in a downstream direction; and a downstream portion with gradually decreasing width in the downstream direction.

According to an embodiment of any paragraph(s) of this summary, a height of the obstruction gradually increases in the downstream direction until a maximum height is reached.

According to an embodiment of any paragraph(s) of this summary, the maximum height is in the downstream portion of the obstruction.

According to an embodiment of any paragraph(s) of this summary, the obstruction is asymmetrical within the isolator, diverting flow on only one side of the isolator.

According to an embodiment of any paragraph(s) of this summary, the isolator defines a flow channel that increases in area in a downstream direction over the length of the isolator.

According to an embodiment of any paragraph(s) of this summary, the isolator defines a flow channel that decreases in area in a downstream direction over the length of the isolator.

According to an embodiment of any paragraph(s) of this summary, the obstruction is in a bulged portion of the isolator.

According to an aspect of the invention, a method of operating a flight vehicle propulsion system includes the steps of: compressing air coming into the propulsion system, in an air intake of the propulsion system; passing the air from the air intake through an isolator of the propulsion system, to a combustor/engine; and using the air from the isolator for combustion of fuel in the combustor. The passing the air through the isolator includes passing the air around an obstruction in the isolator, with flow dividing around the obstruction and then coming together again, thereby mixing the flow.

According to an aspect of the invention, a flight vehicle propulsion system includes: an air inlet; an isolator downstream of the air inlet; and a combustor downstream of the isolator. Air passing through the air inlet and the isolator to the combustor passes through a minimum cross-sectional area at a throat that is at a boundary between the air inlet and the isolator. The isolator includes an obstruction that protrudes into the flowpath of air through the isolator, with the obstruction causing diversion of flow in a radial direction, around the obstruction.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

Figure 1:
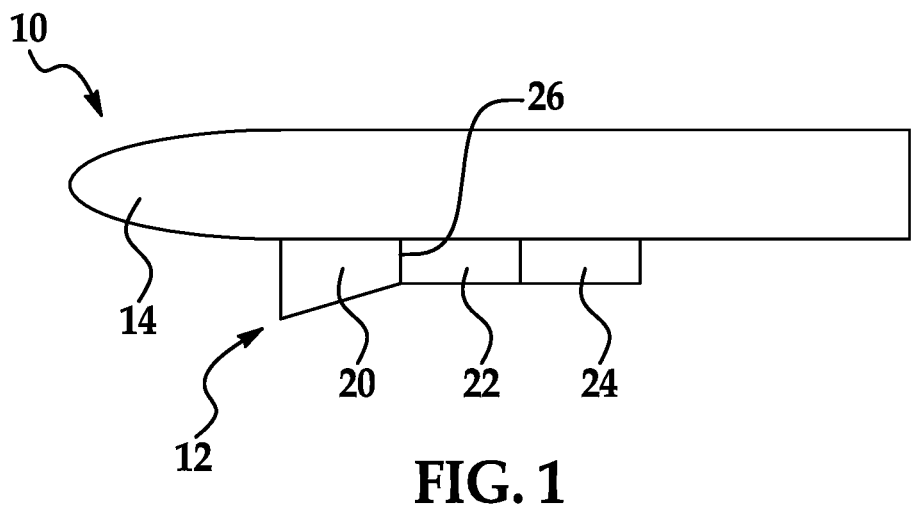
FIG. 1 is a schematic diagram of a flight vehicle according to an embodiment of the present invention.

A flight vehicle has a propulsion system that includes air inlet, an isolator (or diffuser) downstream of the air inlet, and a combustor downstream of the isolator. The isolator includes an obstruction that protrudes inwardly from an inner wall of the isolator, into the flow channel in which air flows through the isolator, from the air inlet to the combustor. The obstruction may be oriented in a longitudinal direction along which flow passes through the isolator, and has a height that is greater than several boundary layer thicknesses of the flow. The obstruction, when placed in regions of low energy/low momentum flow does not allow this flow-state to setup but diverts the flow to either side of it, in a direction perpendicular to the longitudinal direction through the isolator, for example in a radial direction in a round cross-section isolator. During diversion the low energy flow compresses and starts to mix with higher energy flow adjacent to it quickly as it traverses the isolator length. This quick mixing and the additional compression surface of the obstruction increase the pressure rise in the isolator across a shorter distance which can allow for higher pressures to be obtained in a given length. The weak boundary layer flow is diverted away from the centerline and spreads-out across the top surface and across the obstruction, reducing the separation ability and strength that a shock wave boundary layer interaction is capable of producing at high back pressures. This reduction in separation volume in the isolator can reduce low frequency flow oscillations and unsteadiness that occur in separation bubbles in isolators, which can improve operability margin and further improve isolation between any inlet and engine unsteadiness. This decrease in separations can also improve flow uniformity/consistency and steadiness at sideslip angles since there is no reliance of the flow/shock structure on a large-scale separation bubble or low momentum flow region. Yet another benefit of flow separation reduction in the isolator is the potential for flow choking in the isolator to be reduced during inlet starting which can keep the isolator from affecting inlet starting capability at low Mach Numbers. Strong vortices can be created by the obstruction as well, potentially helping further mix the low energy flow, as well as provide stronger fuel/air mixing downstream, in the combustor. Downstream of the obstruction the flow on either side of the obstruction comes together again, leading to further mixing of the flow, for example including mixing of boundary layer flow with flow outside of the boundary layer and low energy flow from the sides with high energy flow from the core. This mixing of flow may make for a more uniform and consistent flow at the exit of the isolator, where the flow proceeds into the combustor, potentially improving combustion efficiency. This mixing of flow may also remove recirculation and low momentum/low Mach Number regions at the isolator exit that are both susceptible to entraining fuel during combustion and subsequent burning in the isolator which is both structurally undesirable/potentially catastrophic and an inefficient mode of combustion. In addition the obstruction may help anchor the location of shocks within the isolator, preventing shocks from migrating upstream into the air inlet at higher back pressures than would be possible otherwise, and from migrating downstream into the combustor at lower back pressures than would be possible otherwise.

FIG. 1 schematically shows an air vehicle 10 that is powered by a propulsion system 12 that is mechanically coupled to a fuselage 14. The air vehicle 10 may be a missile, pulse detonation engine, projectile, an unmanned aircraft (an unmanned aerial vehicle or UAV), manned aircraft or an access-to-space vehicle. The air vehicle may have any of a variety of sizes, and any of a variety of operating conditions. In much of the description below the air vehicle 10 is described in terms of a high supersonic to hypersonic air vehicle, with a Mach number ranging from 4 to 6, or more broadly with a Mach number of 2 to 25. However the air vehicle 10 may operate at lower supersonic speeds (Mach number greater than one), or even at subsonic speeds.

The propulsion system 12 may be coupled to the fuselage 14 in any of a variety ways, including parts of the propulsion system 12 being integrally formed with parts of the fuselage 14. The fuselage 14 may have any of a variety of suitable shapes, and may include additional components for carrying out one or more operations of the air vehicle 10. Such additional components, to give a few non-limiting examples, may include control systems (such as for steering), lift-producing and/or control surfaces (such as wings, fins, or canards, either fixed in position or movable in whole or in part), communication systems, cooling systems, sensors or other data-collecting systems, and/or any of a variety of payloads.

Figure 2:
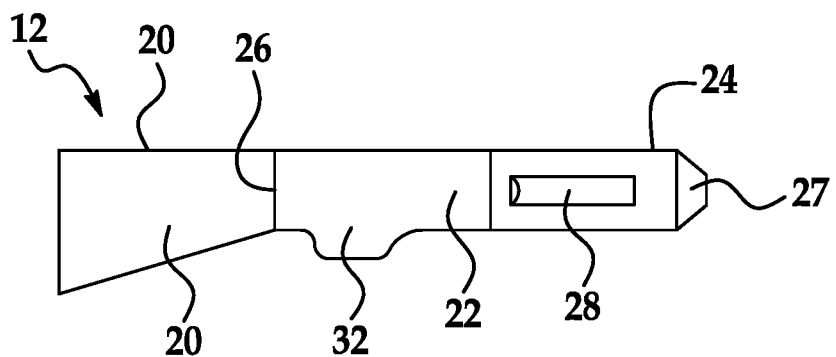
FIG. 2 is a diagram showing components of a propulsion system of the flight vehicle of FIG. 1.
Figure 3:
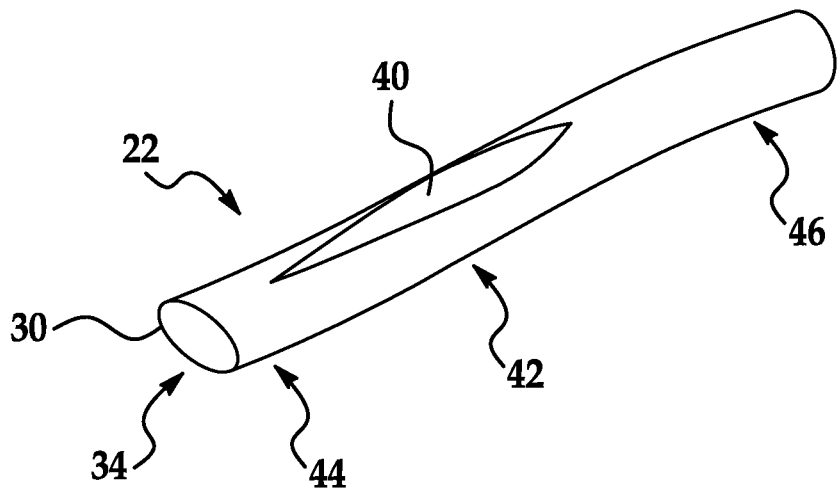
FIG. 3 is an oblique view of an isolator that may be part of the propulsion system of FIG. 2.
Figure 4:
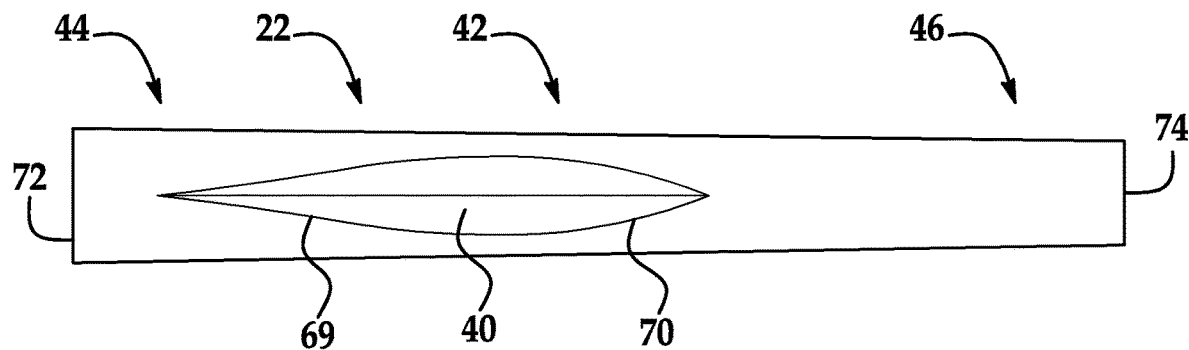
FIG. 4 is a plan view of the isolator of FIG. 3.
Figure 5:
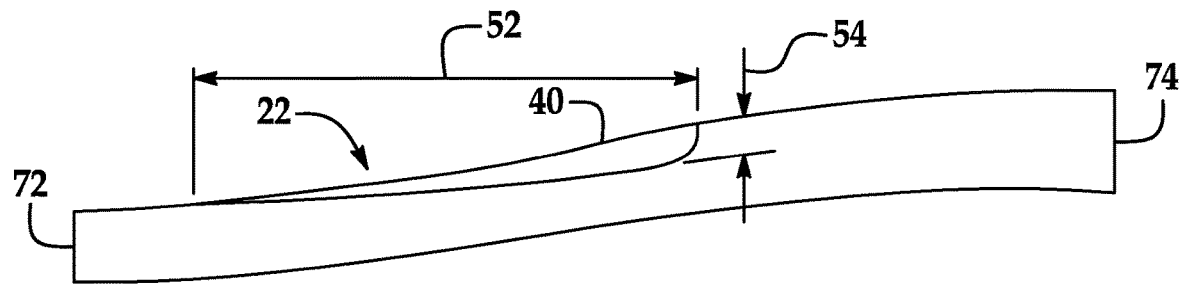
FIG. 5 is a side view of the isolator of FIG. 3.
Figure 6:
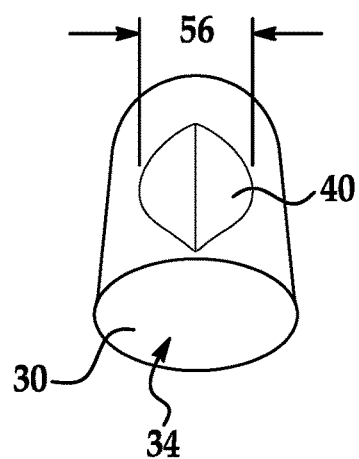
FIG. 6 is an end view of the isolator of FIG. 3.

With reference in addition to FIG. 2, the propulsion system 12 includes an air inlet 20, an isolator or diffuser 22, and a combustor or engine combustor 24. The air inlet 20 takes in air from the free air stream and compresses the air, with one or more shocks perhaps occurring as the flow is compressed. The compressed air then exits the air inlet 20 to enter into the isolator 22. There may be a throat 26, a minimum area location at the boundary between the air inlet 20 and the isolator 22. The isolator 22 functions to keep the shocks stable, isolates dynamic flow fluctuations between the inlet and the engine, provides demanded pressure rises, and/or provides desired flow patterns at its downstream end, where the air passes from the isolator 22 to the combustor 24. In the combustor 24 fuel is added to the air flow, mixed, combustion occurs, and the combusted flow is passed through a nozzle 27, and thrust is produced by the propulsion system 12, which is used to power the air vehicle 10. Combustion products are exhausted from a downstream end of the combustor 24 through the nozzle 27. The propulsion system 12 thus defines a flowpath or propulsion flowpath through the inlet 20, the isolator 22, the engine combustor 24, and the nozzle 27.

The combustor 24 may be any of variety of suitable devices for burning a fuel-air or fuel-oxidizer mixture and producing thrust. For example the combustor 24 (and/or the propulsion system 12) may be a ramjet, a scramjet, a dual-mode ramjet/scramjet, or perhaps a turbine jet, or a combination of these as in a turbine based combined-cycle system. In FIG. 2 the combustor 24 is shown as having a turbine 28, but in many embodiments the combustor 24 has no turbine (or other moving parts).

The inlet 20 may have any of a variety of suitable shapes, for example being round, elliptical, rectangular, or of a complex three dimensional, shape transitioning, streamline traced variety. The isolator 22 may have a general shape that makes the transition between a square, rectangular, trapezoidal or elliptical shape of the inlet 20 (to give a few examples) to a round or other-shaped combustor 24. The inlet 20 and the combustor 24 may be in line with each other, or may be offset from one another and at different angular orientations.

FIGS. 3-6 show further details of an embodiment of the isolator 22. The isolator 22 has an inner wall or flow boundary 30 that bounds (surrounds) an internal volume or flow channel 34 of the isolator 22 through which air flows through the isolator 22. The inner wall or flow boundary 30 may have a cross-sectional shape, perpendicular to the direction of air flow through the isolator 22, that is a convex shape along most of the length of the isolator 22. The convex shape is characterized by not having any concave portions, such that it is impossible to draw a line between any two points in the cross section that passes outside of the cross section. Such a convex shape may have any of a variety of shapes, including circular, rectangular, and elliptical.

In contrast to the convexity through most of the length (extent in the longitudinal direction) of the isolator 22, an obstruction 40 is located in a central part 42 of the isolator 22, between an upstream portion 44 and a downstream portion 46. The obstruction 40 extends inward from the inner wall 30, producing a concavity in the cross-sectional shape of the flow channel 34. The isolator 22 is described herein with the obstruction 40 being a structure mounted on the inner wall 30, and with the inner wall 30 defining the overall shape of the flow channel 34. Alternatively the obstruction 40 may be an integral part of the inner wall 30, such as a variation in the shape of the wall of the isolator 22. However the isolator structure is described, the obstruction 40 provides a change in the shape of the flow channel 34, introducing a concavity into the channel 34 that is not present upstream and downstream of the obstruction 40.

The obstruction 40 has a length 52 that is greater than a width 56 of the obstruction 40, and is greater than a height 54 of the obstruction 40. The length 52 of the obstruction 40 may be in the axial or longitudinal direction, the direction along which air flows through the isolator 22. The height 54 of the obstruction 40 may be the extent of the obstruction 40 away from the inner wall 30, for example an extent in the radial direction for a circular channel. The width 56 of the obstruction 40 may be in a direction perpendicular to the height and length, such as in a circumferential direction of a circular channel.

The obstruction 40 may have a length-to-height ratio that may be 20 to 60, or may be more broadly 3 to 100, with it being understood that any end points within these ranges are possible alternatives, and that the ranges listed are only non-limiting examples. The obstruction 40 may have length-to-width ratio that may be 5 to 15, or more broadly 2 to 50, though again that any end points within these ranges are possible alternatives, and that the ranges listed are only non-limiting examples. These ratios may be based on the maximum height or width, or on average values of height or width.

The isolator 22 has a maximum extent (such as a maximum width) at a longitudinal location where the obstruction 40 has a maximum height. For example, if the isolator 22 has a circular cross-section the maximum extent would be the diameter at any given longitudinal location. For a rectangular isolator the maximum extent is the distance between opposite sides of the channel defined by the inner wall 30 of the isolator 22. The ratio of the maximum extent of the isolator at the longitudinal location of the maximum height of the obstruction 40, to the maximum height of the obstruction 40, may be values given elsewhere herein.

The height of the obstruction 40 may be sufficient to extend beyond the boundary layer flow along the inner wall 30 of the isolator 22, and into the core flow through the main portion of the isolator channel. Having the height of the obstruction 40 be greater than the boundary layer thickness may aid in mixing of the flow, with flow from outside the boundary layer mixing in with the flow in the boundary layer as well as low momentum flow mixing with higher momentum flow. This may result in more uniform flow at the exit of the isolator 22, where the air flow moves into the combustor 24 (FIG. 2).

Figure 7:
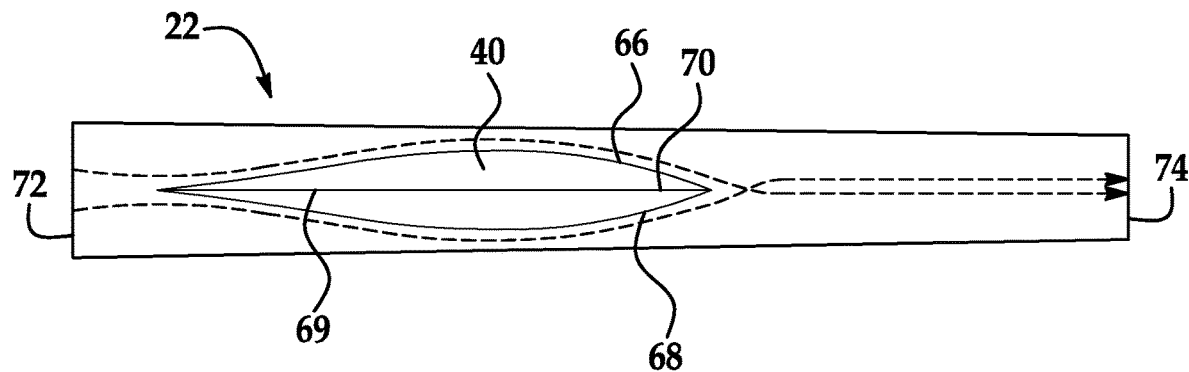
FIG. 7 is a plan view showing possible streamlines of flow through the isolator of FIG. 3.

In addition, with reference now also to FIG. 7, the diversion of the flow laterally (in the direction of the width of the obstruction 40) also results in increased mixing of the flow, as illustrated with the streamlines 66 and 68. The flow is pushed away in from the obstruction 40 on either side of the obstruction 40 as the obstruction 40 increases in width, on the upstream side of the obstruction 40. This separation of the flow is in the circumferential direction for flows through a circular cross section, and more generally is in the direction of the width of the obstruction 40, perpendicular to the length (longitudinal extent or extent in the general direction of air flow through the isolator 22) of the obstruction 40, as well as being perpendicular to the height (radial extent or extent away from the inner wall 30) of the obstruction 40. On the downstream side of the obstruction 40, where the width of the obstruction is decreasing (or alternatively ends abruptly), air flows in toward the obstruction 40 from both sides. Just downstream of the obstruction 40 this inward flow from both sides mixes together. This may result in further mixing between the boundary layer flow and the flow outside of the boundary layer. Mixing of the low energy flow that was diverted around the obstruction with the high energy core flow that remained in the center of the duct also occurs. Again the result may be a more uniform flow, particularly in the part of the flow channel 34 downstream of where the obstruction 40 is located. The more uniform flow that may occur due to the presence of the obstruction 40 may offer many advantages to the propulsion system 12, among them one or more of improved thrust (increased acceleration), improved fuel efficiency, reduced weight and/or volume, increased predictability in operation that may reduce development and testing for new engines, and/or reducing or alleviating the risk of isolator burn through.

By tailoring the flow through use of the obstruction 40, to make the flow exiting the isolator 22 more uniform, performance of the propulsion system 12 (FIG. 1) may be improved. A distorted flow profile (non-uniform flow at the exit of the isolator 22) reduces combustion efficiency across much of the flight envelope, for example decreasing flight vehicle range and/or acceleration capability. In addition distorted (non-uniform) flows often have low-momentum flow regions, which raise the possibility of isolator burnthrough, can cause non-uniform combustor heating, and/or can severely limit the ability to carry out affordable and relevant ground testing of engine performance. The obstruction 40 may alleviate or remove some or all of these problems/disadvantages.

The obstruction 40 may have any of a wide variety of shapes, for example having a wedge shape increasing in width on the upstream side 69 of the obstruction 40, and another wedge shape of decreasing width on the downstream side 70 of the obstruction 40. These wedges may have constant slope, or may have changes in slope, for example having variation in the slope to smoothly transition from the upstream-side wedge to the downstream-side wedge. The height of the obstruction 40 may be constant along the length of the obstruction 40, or alternatively may vary along the length. In the illustrated embodiment the maximum height is in the aft (downstream) part or side of the obstruction 40.

The obstruction 40 has been described above as aligned with the flow, with the length of the obstruction 40 along the same general direction as flow flows through the flow channel 34. Alternatively the obstruction 40 may align other than parallel to the flow direction, although having the obstruction 40 not parallel to the flow that is well above the boundary layer height may increase isolator exit flow non-uniformity, may reduce operability may reduce flow consistency across large flight regimes, may reduce maximum pressure rise capability, and/or may affect the flow in other undesirable ways.

There may be a single obstruction 40, as shown in the illustrated embodiment. The obstruction 40 may be located along the inner wall 30 so as to promote shock anchoring, flow mixing, reduced strength shock wave boundary layer interactions, and increase vortex roll-up in a selected part of the isolator 22, such as in the upper portion of the isolator 22, as in the illustrated embodiment. The portion of the isolator 22 where the obstruction 40 is placed may be a function of what sort of air flow profile is expected at the downstream end of the isolator 22 in the absence of the obstruction 40. This in turn may be a function of the configuration of the forebody 14 (FIG. 1) and the air inlet 20 (FIG. 1), both of which affect the flow profile entering the isolator and subsequent positioning and shaping of the obstruction 40. The range of operating conditions expected for the propulsion system 12 (FIG. 1) also affects sizing/positioning since these factors, such as Mach number, altitude (free stream air density), angle of attack, sideslip, and/or throttle setting change the flow structure either entering the isolator and/or the flow phenomena present internal to the isolator.

The obstruction 40 may also aid in preventing undesired movement of shocks within the isolator 22, helping to anchor the shocks within the isolator 22. Toward that end the obstruction 40 may be in an upstream half of the isolator 22 and may allow the shock system to stay anchored in the isolator at higher back pressures than would be possible otherwise before the shock system is expelled upstream, forward of the inlet throat.

As an alternative, there may be multiple obstructions located in the isolator. The multiple obstructions may be at different longitudinal locations, or at the same longitudinal location. The different shocks may be offset from one another in a circumferential or other direction along the isolator inner wall, or may be at the same circumferential location (or location analogous to a circumferential location) relative to the isolator inner wall. Depending on the flow profile entering the isolator from the inlet the use of multiple obstructions may further enhance flow mixing within the isolator in general, and/or to enhance flow mixing in certain parts of the flow channel, such as where there is relatively low momentum flow, a relatively large boundary layer, and/or the possibility of flow recirculations for certain operating conditions.

The obstruction 40 may enhance the ability of the propulsion system 12 (FIG. 1) to operate over a broader range of operating conditions (Mach numbers, throttle settings, altitudes, angles of sideslip, and/or angles of attack). To that end, the obstruction 40 may increase the back pressure capability of the engine 12 as well as the combustion efficiency, which can increase the throttle range and/or acceleration capability of a given engine 12, and may improve the operability margin of the propulsion system 12. Depending on the vehicle's flight condition, increased back pressure capability can be achieved at higher throttle settings before inlet unstart occurs and therefore a higher thrust/ acceleration capability at a given flight condition. For a dual-mode ramjet/scramjet this generally occurs at the lowest operating Mach Number as the engine demands a very high pressure rise here that is difficult for the isolator to produce due to many factors. This increased back pressure capability can also allow for operation at even lower Mach numbers for a given throttle setting, assuming the inlet can start. Improved flow mixing can improve combustion efficiency due to better fuel/air mixing and decreased average Mach Number of the majority of the core flow and hence, longer residence (combustion) time for flow in the combustor. A combustion efficiency rise is directly responsible for increased thrust and decreased specific fuel consumption (increased fuel efficiency). Such characteristics may allow for a reduction in engine size, producing a savings in weight, vehicle integration/packaging, and/or cost. The obstruction 40 may also aid in avoiding the problem of isolator burn through, where flow recirculations in the isolator can entrain fuel from the combustor that may combust in the isolator and produce hot spots or heated regions within the isolator 22 that can possibly cause damage to the isolator 22.

The isolator 22 has a tapering shape, reducing from a relatively wide upstream end 72 to a relatively narrow downstream end 74. The reducing in width may occur at a constant slope, although other shapes are possible.

Figure 8:
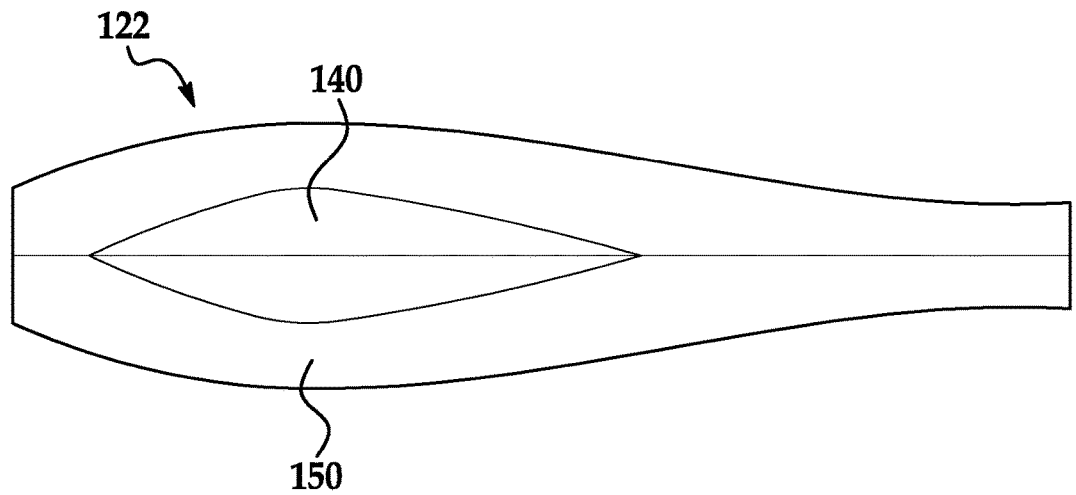
FIG. 8 is a plan view of an embodiment isolator according to an alternate embodiment of the invention.
Figure 9:
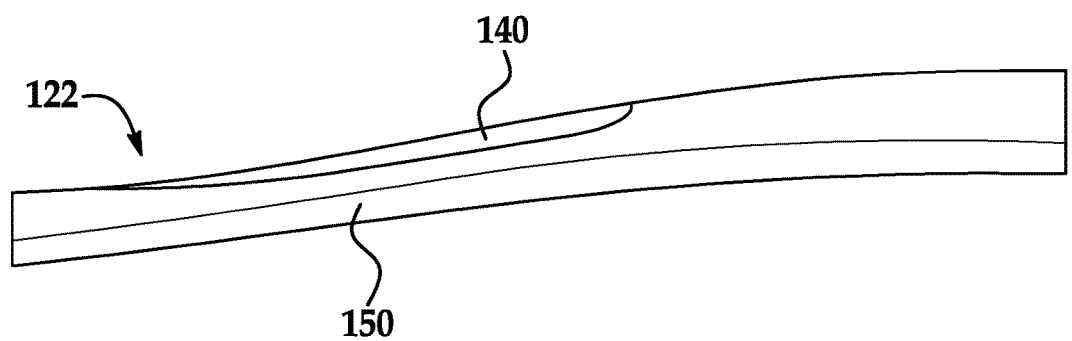
FIG. 9 is a side view of the isolator of FIG. 8.

FIGS. 8 and 9 show an alternative isolator 122, which has an obstruction 140 that is in a relatively wide bulged central region or portion 150. The central region or portion 150 may be wider, or may be greater in at least one extent, than both upstream and downstream regions of the isolator 122. The bulged portion 150 may provide further advantages in the isolator 122, aiding in mixing flow and/or in anchoring shocks within the isolator 122. In other aspects the isolator 122 may be similar to the isolator 22.

Figure 10:
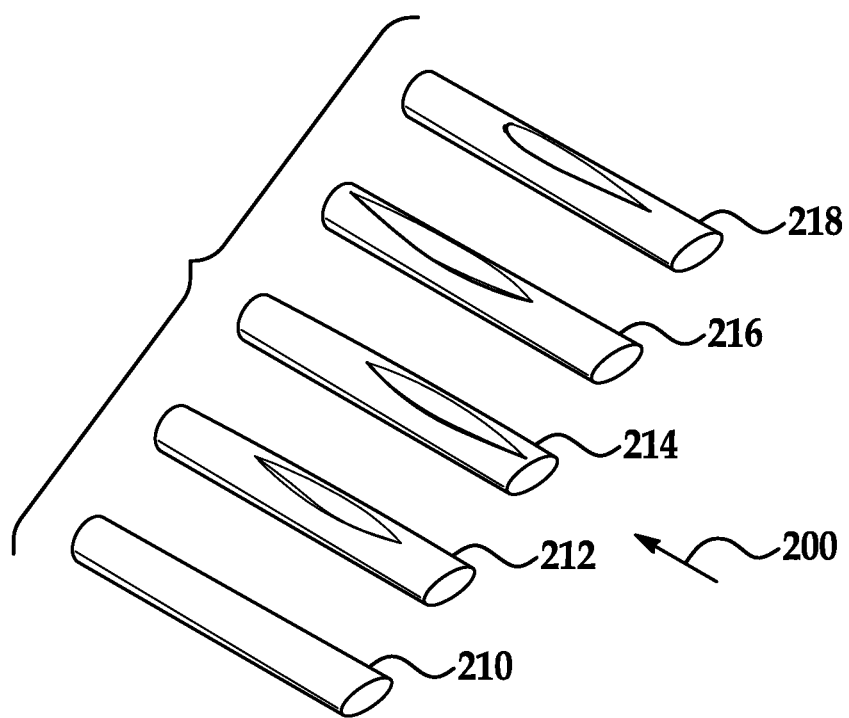
FIG. 10 shows a first set of possible variations in isolator configuration, according to alternative embodiments of the present invention.

It will be appreciated that the isolator and the obstruction may have a wide variety of other configurations than those in the illustrated embodiments. FIGS. 10-14 show many possible alternative types of configurations. FIG. 10 shows possible configurations of obstruction location, relative to a flow direction 200. The isolator 210 is a prior art isolator, without any obstruction. Isolators 212-218 are moderate-aspect-ratio isolators, with the obstructions in various locations. The isolator 212 has a standard obstruction centrally located. The isolator 214 has a standard obstruction located at a forward (upstream) end. The isolator 216 has a standard obstruction located at an aft (downstream, trailing) end. The isolator 218 has an obstruction with a blunt downstream end.

Figure 11:
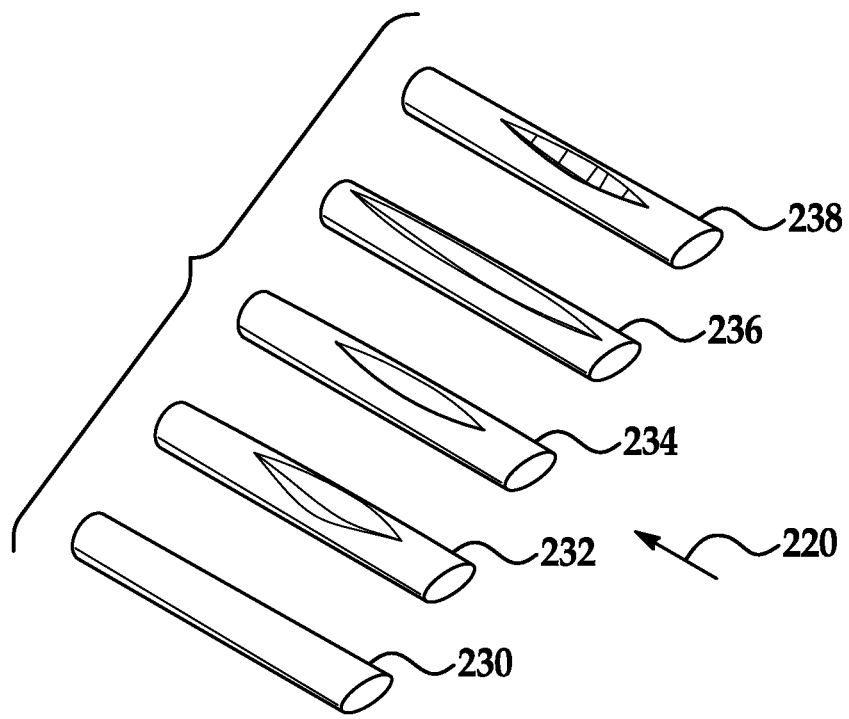
FIG. 11 shows a second set of possible variations in isolator configuration, according to alternative embodiments of the present invention.

FIG. 11 shows some possible obstruction shapes, with a flow direction 220 shown. The isolator 230 is a prior art isolator, without any obstruction. Isolators 232-238 are moderate-aspect-ratio-inlet isolators, with the obstructions in various shapes. The isolator 232 has a relatively wide obstruction. The isolator 234 has a high (tall) obstruction, extending further into the flow channel. The isolator 236 has a relatively long obstruction. The isolator 238 has an obstruction with a faceted shape.

Figure 12:
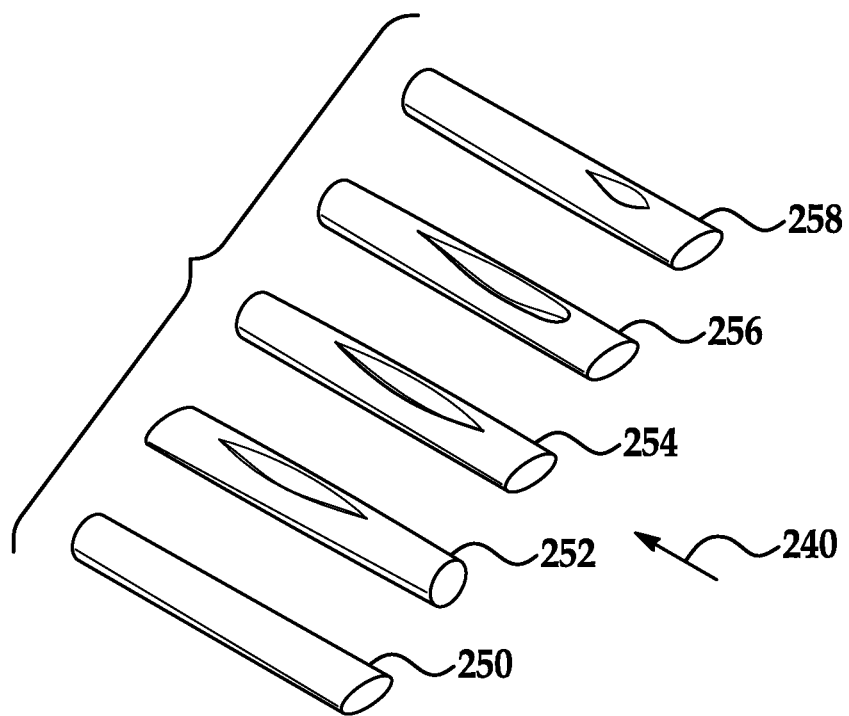
FIG. 12 shows a third set of possible variations in isolator configuration, according to alternative embodiments of the present invention.

FIG. 12 shows more possible obstruction shapes, with a flow direction 240 shown. The isolator 250 is a prior art isolator, without any obstruction. Isolators 252-258 are isolators with the obstructions in various shapes. The isolator 252 has a cylindrical inlet, with a standard-shape obstruction. The isolator 254 has a high (tall) leading edge for its obstruction, with the leading edge extending further into the flow channel. The isolator 256 has an obstruction with a blunt leading edge. The isolator 258 has a short obstruction.

Figure 13:
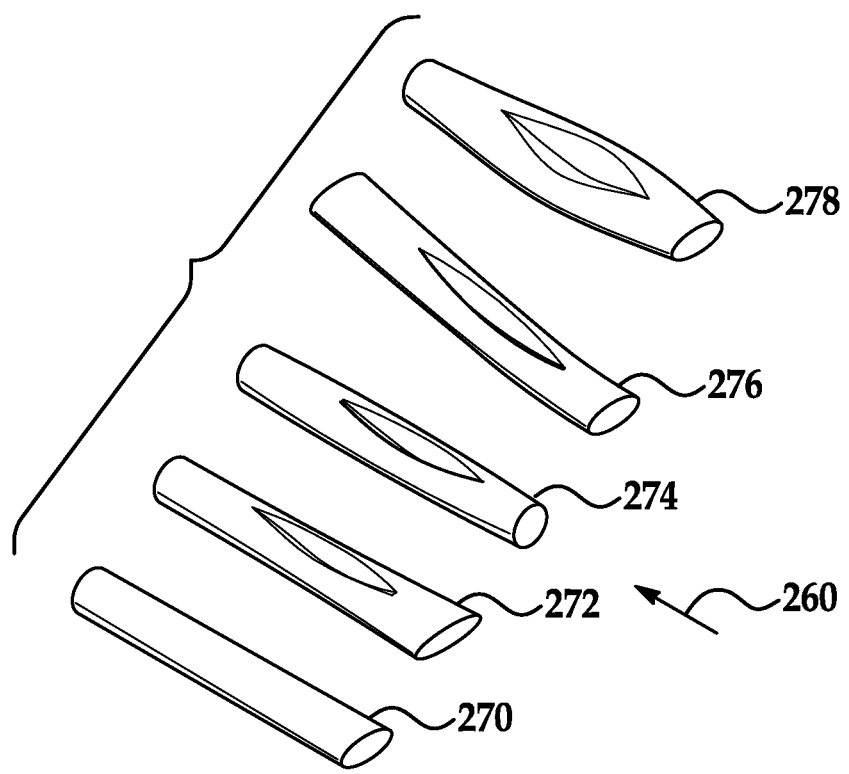
FIG. 13 shows a fourth set of possible variations in isolator configuration, according to alternative embodiments of the present invention.

FIG. 13 shows more possible isolator/obstruction configurations, with a flow direction 260 shown. The isolator 270 is a prior art isolator, without any obstruction. Isolators 272-278 show various isolator/obstruction configurations. The isolator 272 has a high aspect ratio entry, with a standard obstruction. The isolator 274 has a cylindrical entry, with a standard obstruction. The isolator 276 has an S-bend shape. The isolator 278 has a bulged shape.

Figure 14:
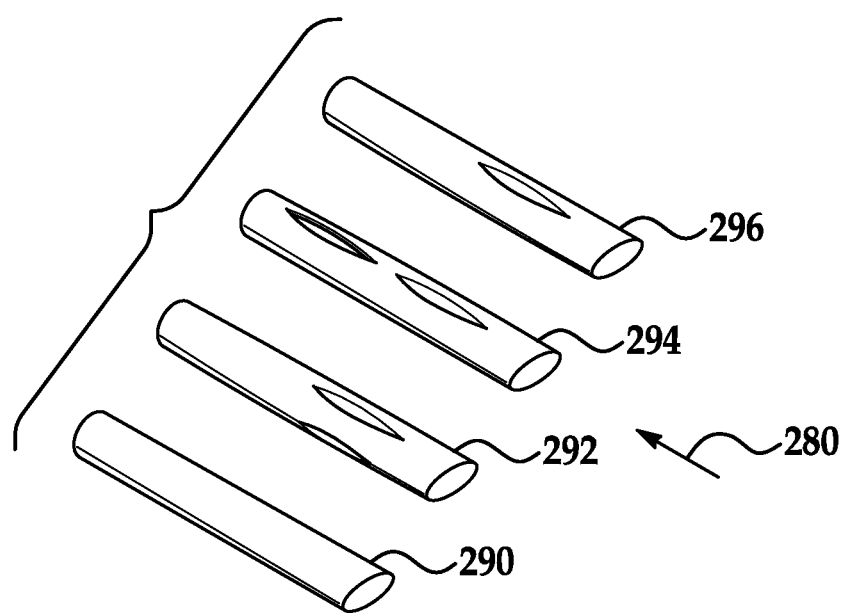
FIG. 14 shows a fifth set of possible variations in isolator configuration, according to alternative embodiments of the present invention.

FIG. 14 shows possible configurations with multiple obstructions, with a flow direction 280 shown. The isolator 290 is a prior art isolator, without any obstruction. Isolators 292-296 have various types of multiple obstructions. The isolator 292 has radially spaced obstructions. The isolator 294 has obstructions that are spaced both radially and axially. The isolator 296 has obstructions that are unsymmetric, with a second obstruction offset radially 90 degrees from the obstruction shown on the top of the isolator 296.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flight vehicle comprising:
a fuselage; and
a propulsion system mechanically coupled to the fuselage;
wherein the propulsion system includes:
an air inlet;
an isolator downstream of the air inlet; and
a combustor downstream of the isolator;
wherein air passing through the air inlet and the isolator to the combustor passes through a minimum cross-sectional area at a throat that is at a boundary between the air inlet and the isolator;
wherein the isolator includes an obstruction that protrudes from an inner wall of the isolator into the flowpath of air through the isolator, with the obstruction causing diversion of flow in a radial direction, around the obstruction; and
wherein the obstruction has a wedge shape increasing in width on an upstream side, and another wedge shape of decreasing width on a downstream side.

2. The flight vehicle of claim 1, wherein the obstruction has a length in a longitudinal direction along which air flows through the isolator that is greater than a width of the obstruction in the radial direction.

3. The flight vehicle of claim 1, wherein the obstruction has a height that extends beyond a boundary layer thickness of the air flow through the isolator.

4. The flight vehicle of claim 1, wherein the obstruction has a maximum height that is at least 20% of the height of the isolator at a longitudinal location of the maximum height.

5. The flight vehicle of claim 1, wherein the obstruction has a maximum height that is at least 20% of a maximum extent of the isolator at a longitudinal location of the maximum height.

6. The flight vehicle of claim 1, wherein the obstruction is closer to an upstream end of the isolator than to a downstream end of the isolator, thereby being closer to the air intake than to the combustor.

7. The flight vehicle of claim 1, wherein the inner wall defines a convex flow channel through the isolator, with the obstruction introducing a concavity into the flow channel.

8. The flight vehicle of claim 1, wherein the combustor is a ramjet or a scramjet.

9. The flight vehicle of claim 1, wherein the combustor includes a turbine.

10. The flight vehicle of claim 1, wherein the propulsion system is a supersonic engine or a hypersonic engine.

11. The flight vehicle of claim 1, wherein the propulsion system is a subsonic engine.

12. The flight vehicle of claim 1, wherein the obstruction is in a bulged portion of the isolator.

13. The flight vehicle of claim 1, wherein the obstruction separates the flow in circumferential directions around the obstruction, causing mixing downstream of the obstruction.

14. A flight vehicle comprising:
a fuselage; and
a propulsion system mechanically coupled to the fuselage;
wherein the propulsion system includes:
an air inlet;
an isolator downstream of the air inlet; and
a combustor downstream of the isolator;
wherein air passing through the air inlet and the isolator to the combustor passes through a minimum cross-sectional area at a throat that is at a boundary between the air inlet and the isolator;
wherein the isolator includes an obstruction that protrudes from an inner wall of the isolator into the flowpath of air through the isolator, with the obstruction causing diversion of flow in a radial direction, around the obstruction; and
wherein the obstruction includes:
an upstream portion with gradually increasing width in a downstream direction; and
a downstream portion with gradually decreasing width in the downstream direction.

15. The flight vehicle of claim 14, wherein a height of the obstruction gradually increases in the downstream direction until a maximum height is reached.

16. The flight vehicle of claim 15, wherein the maximum height is in the downstream portion of the obstruction.

17. The flight vehicle of claim 14, wherein the obstruction separates the flow in circumferential directions around the obstruction, causing mixing downstream of the obstruction.

18. The flight vehicle of claim 14, wherein the obstruction has a length in a longitudinal direction along which air flows through the isolator that is greater than a width of the obstruction in the radial direction.

19. The flight vehicle of claim 14, wherein the obstruction has a height that extends beyond a boundary layer thickness of the air flow through the isolator.

20. The flight vehicle of claim 14, wherein the obstruction has a maximum height that is at least 20% of the height of the isolator at a longitudinal location of the maximum height.

21. The flight vehicle of claim 14, wherein the obstruction has a maximum height that is at least 20% of a maximum extent of the isolator at a longitudinal location of the maximum height.

22. The flight vehicle of claim 14, wherein the obstruction is closer to an upstream end of the isolator than to a downstream end of the isolator, thereby being closer to the air intake than to the combustor.

23. A method of operating a flight vehicle propulsion system, the method comprising:
compressing air coming into the flight vehicle propulsion system, in an air intake of the flight vehicle propulsion system;
passing the air from the air intake through an isolator of the flight vehicle propulsion system, to a combustor of the flight vehicle propulsion system; and
using the air from the isolator for combustion of fuel in the combustor
wherein the passing the air through the isolator includes passing the air around an obstruction in the isolator, with flow dividing around the obstruction and then coming together again, thereby mixing the flow: and
wherein the passing the air around the obstruction reduces flow separations and/or recirculations, and reduces low momentum flow regions within the flow.

24. The method of claim 23, wherein the passing the air around the obstruction increases vortex strength within the flow.

25. The method of claim 23, wherein the passing the air around the obstruction aids in anchoring one or more shocks within the isolator.

* * * * *